US012183094B2

(12) United States Patent
Nguyen et al.

(10) Patent No.: US 12,183,094 B2
(45) Date of Patent: Dec. 31, 2024

(54) METHOD AND SYSTEM FOR TRAINING A MACHINE LEARNING MODEL FOR POINT OF GAZE PREDICTION

(71) Applicant: VINAI ARTIFICIAL INTELLIGENCE APPLICATION AND RESEARCH JOINT STOCK COMPANY, Ha Noi (VN)

(72) Inventors: Viet Thanh Dat Nguyen, Ha Noi (VN); Tuan Anh Tran, Ha Noi (VN); Van Cuong Pham, Ha Noi (VN); Minh Hoai Nguyen, Ha Noi (VN); Hai Hung Bui, Ha Noi (VN)

(73) Assignee: VINAI ARTIFICIAL INTELLIGENCE APPLICATION AND RESEARCH JOINT STOCK COMPANY, Ha Noi (VN)

( * ) Notice: Subject to any disclaimer, the term of this patent is extended or adjusted under 35 U.S.C. 154(b) by 379 days.

(21) Appl. No.: 17/894,995

(22) Filed: Aug. 24, 2022

(65) Prior Publication Data

US 2023/0206656 A1 Jun. 29, 2023

(30) Foreign Application Priority Data

Dec. 24, 2021 (VN) ............................ 1-2021-08354

(51) Int. Cl.

| | |
|---|---|
| ***G06V 20/59*** | (2022.01) |
| ***G06V 10/774*** | (2022.01) |
| ***G06V 40/16*** | (2022.01) |

(52) U.S. Cl.
CPC .......... *G06V 20/597* (2022.01); *G06V 10/774* (2022.01); *G06V 40/161* (2022.01); *G06V 40/171* (2022.01)

(58) Field of Classification Search
CPC ............... G06V 20/597; G06V 10/774; G06V 40/161; G06V 40/171; G06V 40/18; G06V 10/764; G06V 10/82; G06V 40/19; G06V 40/193
USPC ........................................................ 382/103
See application file for complete search history.

(56) References Cited

U.S. PATENT DOCUMENTS

| | | | | |
|---|---|---|---|---|
| 7,742,623 B1* | 6/2010 | Moon | G06V 40/19 | |
| | | | 382/103 | |
| 2015/0286853 A1* | 10/2015 | Shapovalova | G06F 18/24 | |
| | | | 382/103 | |
| 2018/0061116 A1* | 3/2018 | Mitchell | G06F 3/011 | |
| 2021/0271321 A1* | 9/2021 | Zhou | G06V 40/00 | |
| 2023/0351802 A1* | 11/2023 | Hashimoto | G06V 10/774 | |
| 2024/0046612 A1* | 2/2024 | Panetta | G06T 7/0004 | |

* cited by examiner

*Primary Examiner* — Negussie Worku
(74) *Attorney, Agent, or Firm* — United One Law Group LLC; Kongsik Kim; Jhongwoo Peck

(57) ABSTRACT

A method and system for training a machine learning model for point of gaze prediction simultaneously analyzes the image of the scene and the image of the driver's face using the machine learning model to generate a point of gaze of a driver in traffic environments. The machine learning model comprises a camera calibration module that can compute an embedding vector that represents the spatial configuration between the driver and the camera system. The camera calibration module improves the overall model's performance, which is jointly trained end to end.

9 Claims, 2 Drawing Sheets

100 Triplet loss 101 108 102 Euclidean distance loss 109 110 111 112 113 103 104 105 106 107

METHOD AND SYSTEM FOR TRAINING A MACHINE LEARNING MODEL FOR POINT OF GAZE PREDICTION

CROSS-REFERENCE TO RELATED APPLICATION

The present application claims priority from Vietnamese Application No. 1-2021-08354 filed on Dec. 24, 2021, which is incorporated herein by reference in its entirety.

TECHNICAL FIELD

The present invention generally relates to a method and system for training a machine learning model for point of gaze prediction.

RELATED ART

Driving assistant plays an important role in the field of intelligent driving. For example, the technology that assists drivers in driving and parking functions uses sensors and cameras to detect nearby obstacles or driver errors and respond accordingly. Many popular systems use assisted driving technology to support a driver in traffic warnings, lane departure and lane centering, obstacle alert, and so on. This may increase not only car and road safety but also enhance the driving experiences.

The tasks mentioned above may focus on analyzing driving or traffic scenes without tracking driver attention, such as what parts of the driving or traffic scene the driver is attending. This may lead to a redundant warning or alert. For example, while the driver is paying attention to the driving scene and actively driving a vehicle, he is highly aware of traffic context (such as common traffic signs). A warning about a traffic sign may be redundant and may diminish the driving experience. Therefore, driver attention tracking is an important and interesting issue.

One approach to tracking driver attention, particularly tracking the driver's points of gaze, is to use a pair of eye-tracking glasses as suggested by [1]. The eye-tracking glasses are accurate in tracking the driver's points of gaze. However, they are expensive and intrusive, so they are not practical for widespread deployment and everyday usage. Furthermore, eye-tracking glasses do not always tell what the driver misses, even though they always tell what the driver looks at. The driver may not know about potential danger on the road unless the danger is inside the field of view of the eye-tracking glasses. This is, however, not guaranteed because the field of view of the eye-tracking glasses depends on the direction of the driver's head, and the driver can be distracted by things inside the vehicle.

Hence, it is necessary to a novel approach not only for tracking the driver's attention by predicting the driver's point of gaze for detecting potential dangers or distracts of the driver.

CITATION LIST

Non-Patent Literature

[1] Kenneth Holmqvist, Marcus Nystrom, Richard Andersson, Richard Dewhurst, Jarodzka Halszka, and Joost van de Weijer. *Eye Tracking: A Comprehensive Guide to Methods and Measures*. Oxford University Press, United Kingdom, 2011. The citation is herein referred to as

[2] Z. Bylinskii, T. Judd, A. Oliva, A. Torralba, and F. Durand. What do different evaluation metrics tell us about saliency models? *IEEE Transactions on Pattern Analysis and Machine Intelligence,* 41(3):740-757, 2019. The citation is herein referred to as [2].

[3] Yoichi Sato Yusuke Sugano, Yasuyuki Matsushita. Learning-by-synthesis for appearance-based 3d gaze estimation. In *IEEE Conf. Comput. Vis. Pattern Recog.,* 2014. The citation is herein referred to as [3].

[4] Mingxing Tan, Ruoming Pang, and Quoc V. Le. Efficientdet: Scalable and efficient object detection. June 2020. The citation is herein referred to as [4].

[5] Kyle Min and Jason J Corso. Tased-net: Temporally aggregating spatial encoder-decoder network for video saliency detection. pages 2394-2403, 2019. The citation is herein referred to as [5].

[6] Eunji Chong, Yongxin Wang, Nataniel Ruiz, and James M Rehg. Detecting attended visual targets in video. In *Proceedings of the IEEE/CVF Conference on Computer Vision and Pattern Recognition*, pages 5396-5406, 2020. The citation is herein referred to as [6].

[7] Seonwook Park, Emre Aksan, Xucong Zhang, and Otmar Hilliges. Towards end-to-end video-based eyetracking. In *Proceedings of the European Conference on Computer Vision,* 2020. The citation is herein referred to as [7].

SUMMARY

The invention has been made to solve the above-mentioned problems. An object of the invention is to provide a method and system for training a machine learning model capable of predicting a point of gaze of a driver in traffic environments.

Problems to be solved in the embodiments are not limited thereto and include the following technical solutions and also objectives or effects understandable from the embodiments.

According to a first aspect of the invention, there is provided a method for training a machine learning model for point of gaze prediction, the method comprising:

setting the machine learning model to include a camera calibration module and a point of gaze regression module;

obtaining a training dataset that comprises a plurality of pair of images from various driving sessions, wherein each pair of images includes a face image of a driver captured from a first camera mounted on a vehicle and a scene image of environment in front of the vehicle captured from a second camera mounted on the vehicle, wherein the scene image comprises an annotated point of gaze of the driver;

iteratively training the machine learning model using the training dataset by at least:

- processing a first pair of images in the plurality of pair of images using the camera calibration module to generate a first embedding vector;
- processing a second pair of images in the plurality of pair of images using the camera calibration module to generate a second embedding vector wherein the first pair of images and the second pair of images are from the same driving session;
- processing a third pair of images in the plurality of pair of images using the camera calibration module to generate a third embedding vector wherein the first pair of images and the third pair of images are from different driving sessions;
- extracting a facial region of interest (ROI), a right eye ROI and a left eye ROI from a first face image in the first pair of images;

processing the facial ROI, the right eye ROI, the left eye ROI, a first scene image in the first pair of images, and the first embedding vector using the point of gaze regression module to generate a first predicted point of gaze;

minimizing an Euclidean distance loss that measures a distance between the first predicted point of gaze and a first annotated point of gaze corresponding to the first face image on the first scene image; and minimizing a triplet loss that measures a difference between a first distance and a second distance, wherein the first distance measures a difference between the first embedding vector and the second embedding vector, and wherein the second distance measures a difference between the first embedding vector and the third embedding vector.

According to a second aspect of the invention, there is provided a system for training a machine learning model for point of gaze prediction, the system comprises one or more computers and one or more storage devices storing instructions that, when executed by the one or more computers, cause the one or more computers to perform the method according to the first aspect of the invention.

BRIEF DESCRIPTION OF THE DRAWINGS

The above and other objects, features, and advantages of the present invention will become more apparent to those of ordinary skill in the art by describing in detail exemplary embodiments thereof with reference to the attached drawings, in which.

DETAILED DESCRIPTION

Figure 1:
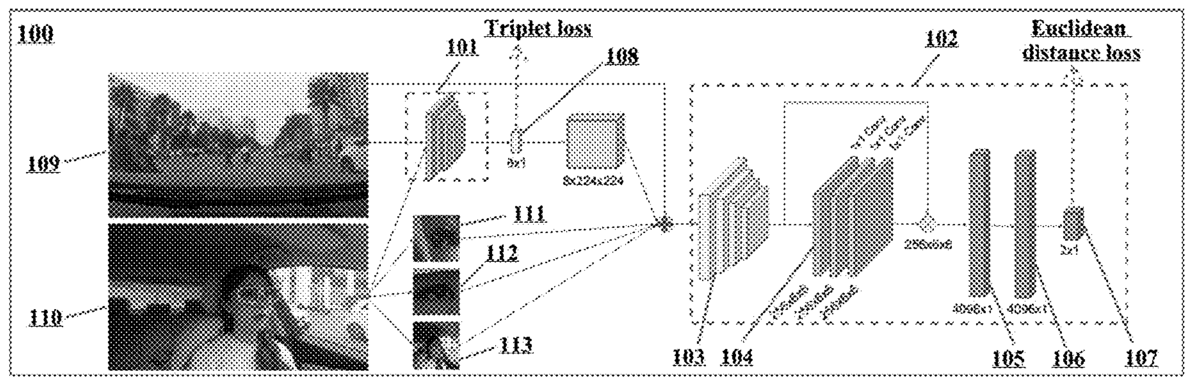
FIG. 1 is a block diagram showing an example system for training a machine learning model for point of gaze prediction.

While the invention may have various modifications and alternative forms, specific embodiments thereof are shown by way of example in the drawings and will be described herein in detail. However, there is no intent to limit the invention to the particular forms disclosed. On the contrary, the invention is to cover all modifications, equivalents, and alternatives falling within the spirit and scope of the appended claims.

It should be understood that, although the terms "first," "second," and the like may be used herein to describe various elements, the elements are not limited by the terms. The terms are only used to distinguish one element from another element. For example, a first element could be termed a second element, and, similarly, a second element could be termed a first element without departing from the scope of the invention. As used herein, the term "and/or" includes any and all combinations of one or more of the associated listed items.

The terminology used herein is for the purpose of describing particular embodiments only and is not intended to be limiting to the invention. As used herein, the singular forms "a," "an," "another," and "the" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings, the same or corresponding components are denoted by the same reference numerals regardless of reference numbers, and thus the description thereof will not be repeated.

And throughout the detailed description and claims of the present disclosure, the term "training/trained" or "learning/learned" refers to performing machine learning through computing in accordance with a procedure. It will be appreciated by those skilled in the art that it is not intended to refer to a mental function such as human educational activity.

As used herein, a model is trained to output a predetermined output with respect to a predetermined input, and may include, for example, neural networks. A neural network refers to a recognition model that simulates a computation capability of a biological system using a large number of artificial neurons being connected to each other through edges.

The neural network uses artificial neurons configured by simplifying functions of biological neurons, and the artificial neurons may be connected to each other through edges having connection weights. The connection weights, parameters of the neural network, are predetermined values of the edges, and may also be referred to as connection strengths. The neural network may perform a cognitive function or a learning process of a human brain through the artificial neurons. The artificial neurons may also be referred to as nodes.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

Hereinafter, training a neural network refers to training parameters of the neural network. Further, a trained neural network refers to a neural network to which the trained parameters are applied.

Basically, the neural network may be trained through supervised learning or unsupervised learning. Supervised learning refers to a method of providing input data and label corresponding thereto to the neural network, while in unsupervised learning, the input data provided to the neural network does not contain label.

A vehicle as described in this disclosure may include, for example, a car or a motorcycle, or any suitable motorized vehicle. Hereinafter, a car will be described as an example.

A vehicle as described in this disclosure may be powered by any suitable power source, and may be, for example, an internal combustion engine vehicle including an engine as a power source, a hybrid vehicle including both an engine and an electric motor as a power source, and/or an electric vehicle including an electric motor as a power source.

A camera as described in this disclosure may include, but is not limited to, various optical and non-optical imaging devices, like a RGB camera, stereovision camera or any device whose output data may be used in perceiving the environment. Other imaging devices capable of observing objects may also be used, such as ultrasonic sensors, sonar, LIDAR, and LADAR devices. Thus, various combinations of one or more cameras and sensors may be used.

FIG. 1 is the block diagram showing an example system for training a machine learning model for point of gaze prediction (hereinafter, the system 100). The system 100 is an example of a system implemented as computer programs on one or more computers in one or more locations in which the systems, components, and techniques described below are implemented. After being trained, the machine learning model is capable of predicting a point of gaze of a driver in traffic environments.

The machine learning model comprises a camera calibration module 101 and a point of gaze regression module 102.

To train the machine learning model, a training dataset is required. The preparation of the training dataset is described later. The training dataset comprises a plurality of pair of images from various driving sessions where each driving session in the various driving sessions is represented by a given destination following a planned route. Each pair of images includes a face image of a driver captured from a first camera mounted on a vehicle and a scene image of environment in front of the vehicle captured from a second camera mounted on the vehicle, in which the scene image comprises an annotated point of gaze of the driver corresponding to the face image. According to an embodiment, the first camera is mounted on the windshield of the vehicle and the second camera is mounted on the dashboard of the vehicle, pointing out to the road.

Let $\{x_i, p_i\}_{i=1}^{n}$ denotes the training dataset in which $x_i$ is a pair of images comprising a face image 110 and a scene image 109. For each training pair of images $x_i$, the system 100 processes $x_i$ using the camera calibration module 101 to generate an embedding vector 108 denoted as $f(x_i)$ where f denotes the camera calibration module 101.

According to an embodiment, the camera calibration module 101 comprises ResNet-18 model, a residual layer and an average pooling layer. The face image 110 in $x_i$ and the scene image 109 in $x_i$ are concatenated to become a 6×224×224 tensor before feeding to the camera calibration module 101. The output of the camera calibration module 101, $f(x_i)$, comprises 8 parameters (i.e., $f(x_i) \varepsilon R^8$) which represent positions and poses of the first camera and the second camera together having a coordinate system centered at the location of the driver. The embedding vector $f(x_i)$ is also constrained to have unit norm $\|f(x_i)\|_2=1$.

The system 100 extracts a facial region of interest (ROI) 113, a right eye ROI (Region Of Interest) 112 and a left eye ROI 111 from the face image 110 in $x_i$. In particular, the system 100 extracts the right eye ROI 112 and the left eye ROI 111 from $x_i$ as follows.

First, the system 100 detects a plurality of facial landmarks from the face image 110. Then, the system 100 determines a first center for the right eye based on two right eye corners in the plurality of facial landmarks and a second center for the left eye based on two left eye corners in the plurality of facial landmarks. Lastly, the system 100 determines the right eye ROI 112 as a first squared window centered at the first center; and determines the left eye ROI 111 as a second squared window centered at the second center.

The system 100 processes the facial ROI 113, the right eye ROI 112, the left eye ROI 111, the scene image 109 in $x_i$, and the embedding vector 108 (i.e., $f(x_i)$) using the point of gaze regression module 102 to generate a predicted point of gaze 107 denoted as $\hat{p}_i$.

According to an embodiment, the point of gaze regression module 102 comprises ResNet-18 model 103, a spatial weighting component 104 comprising three 1×1 convolution layers with ReLU (Rectified Linear Unit) activation layer in between, a final ReLU layer, a drop out layer with a drop-out rate of 0.5, and two fully connected layers 105, 106 with 4096 dimensions. The output of the spatial weighting component 104 is multiplied element-wise with the output of the ResNet-18 model 103, which then enters the ReLU layer and the drop out layer. The input of the point of gaze regression module 102 is resized to 224×224 before being processed.

The system 100 minimizes an Euclidean distance loss that measures a distance between the predicted point of gaze 107 (i.e., $\hat{p}_i$) and an annotated point of gaze $p_i$ corresponding to the face image 110 on the scene image 109. According to an embodiment, the annotated point of gaze $p_i$ is collected from eye-tracking glasses that will be described later. In particular, the Euclidean distance loss is defined according to Equation 1.

$$L_{dist}(x_i)=\beta\cdot\mathrm{Relu}(\|p_i-\hat{p}_i\|_2-\tau)-\alpha\cdot\mathrm{Relu}(\tau-\|p_i-\hat{p}_i\|_2), \quad \text{[Equation 1]}$$

where $L_{dist}$ denotes the Euclidean distance loss; $x_i$ is the pair of images 109 and 110; Relu denotes the function: Relu(x)=max (x, 0); $p_i$ denotes the annotated point of gaze corresponding to the face image 110 on the scene image 109; $\hat{p}_i$ denotes the predicted point of gaze 107; α, β, and τ are tunable hyper-parameters.

The Euclidean distance loss is a continuous piece-wise linear function of the distance. If the distance is greater or equal to T, the loss becomes $\beta\|P-\hat{P}\|_2^2-\beta\tau$, if the distance is smaller than τ, the loss becomes $\alpha\|P-\hat{P}\|_2^2-\alpha\tau$.

In an implemented example, α, β, and τ are set to 0.1, 2, 5, respectively, and μ is set to 0.2. According to an embodiment, α is set smaller than β to scale down the loss (and gradient) when the predicted point of gaze $\hat{p}_i$ is already sufficiently close to the annotated point of gaze $p_i$. This is to account for the inaccuracy of the automatically derived ground truth points of gaze.

To train the camera calibration module 101, the system 100 defines a triplet loss. Desirably, the distance between two embedding vectors for training pairs of images from the same driving session should be smaller than the distance between two embedding vectors of training pairs of images from different sessions. Thus, for each training pairs of images $x_i$, the system 100 randomly samples a training instance $x_i^p$ from the same driving session and another training instance $x_i^n$ from another driving session. Then, the system 100 processes $x_i^p$ and $x_i^n$ using the camera calibration module 101 to generate two embedding vectors $f(x_i^p)$ and $f(x_i^n)$, respectively. The system 100 minimizes the triplet loss that measures a difference between a first distance and a second distance, where the first distance measures a difference between $f(x_i)$ and $f(x_i^p)$, and where the second distance measures a difference between $f(x_i)$ and $f(x_i^n)$. In particular, the triplet loss is defined according to Equation 2.

$$L_{trip}(x_i)=\mathrm{Relu}(\|f(x_i)-f(x_i^p)\|_2-\|f(x_i)-f(x_i^n)\|_2+\mu), \quad \text{[Equation 2]}$$

where $L_{trip}$ denotes the triplet loss; $\mu$ denotes a margin being a hyper-parameter.

Accordingly, the camera calibration module 101 and the point of gaze regression module 102 are trained jointly by minimizing a total loss L defined according to Equation 3.

$$L = \frac{1}{n}\sum_{i=1}^{n}(L_{dist}(x_i) + L_{trip}(x_i)) \quad \text{[Equation 3]}$$

Figure 2:
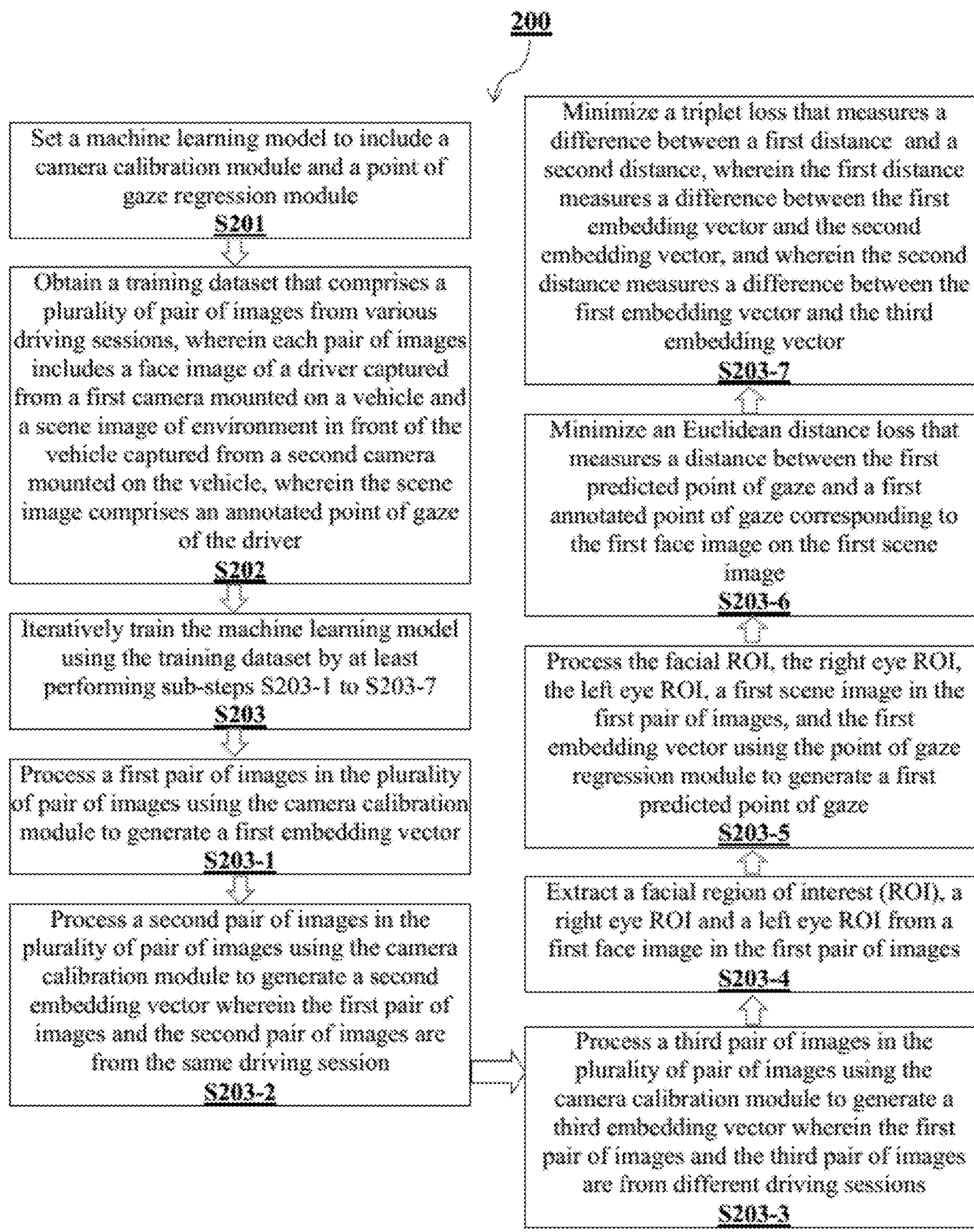
FIG. 2 is a flow diagram of an example process for training a machine learning model for point of gaze prediction using the example system of FIG. 1.

FIG. 2 is a flow diagram of an example process 200 for training a machine learning model for point of gaze prediction. For convenience, the process 200 will be described as being performed by a system of one or more computers located in one or more locations. For example, a system for training a machine learning model for point of gaze prediction, e.g., the system 100 for training a machine learning model for point of gaze prediction (hereinafter referred to as "the system") of FIG. 1, appropriately programmed, can perform the process 200.

In step S201, the system sets the machine learning model to include a camera calibration module (for example, the camera calibration module 101 of FIG. 1) and a point of gaze regression module (for example, the point of gaze regression module 102 of FIG. 1).

According to an embodiment, the camera calibration module comprises ResNet-18 model, a residual layer and an average pooling layer.

According to an embodiment, the point of gaze regression module comprises ResNet-18 model, a spatial weighting component comprising three 1×1 convolution layers with ReLU (Rectified Linear Unit) activation layer in between, a ReLU layer, a drop out layer with a drop-out rate of 0.5 and two fully connected layers with 4096 dimensions.

In step S202, the system obtains a training dataset that comprises a plurality of pair of images from various driving sessions, in which each pair of images includes a face image of a driver captured from a first camera mounted on a vehicle and a scene image of environment in front of the vehicle captured from a second camera mounted on the vehicle, wherein the scene image comprises an annotated point of gaze of the driver corresponding to the face image.

According to an embodiment, each driving session in the various driving sessions is represented by a given destination following a planned route.

According to an embodiment, the first camera is mounted on the windshield of the vehicle and the second camera is mounted on the dashboard of the vehicle.

In step S202, the system iteratively trains the machine learning model using the training dataset by at least performing sub-steps S203-1 to S203-7.

In sub-step S203-1, the system processes a first pair of images (for example, the pair of images $x_i$ as mentioned in the description of FIG. 1) in the plurality of pair of images using the camera calibration module to generate a first embedding vector (for example, the embedding vector $f(x_i)$ as mentioned in the description of FIG. 1).

In sub-step S203-2, the system processes a second pair of images (for example, the pair of images $x_i^p$ as mentioned in the description of FIG. 1) in the plurality of pair of images using the camera calibration module to generate a second embedding vector (for example, the embedding vector $f(x_i^p)$ as mentioned in the description of FIG. 1), in which the first pair of images and the second pair of images are from the same driving session.

In sub-step S203-3, the system processes a third pair of images (for example, the pair of images $x_i^n$ as mentioned in the description of FIG. 1) in the plurality of pair of images using the camera calibration module to generate a third embedding vector (for example, the embedding vector $f(x_i^n)$ as mentioned in the description of FIG. 1) in which the first pair of images and the third pair of images are from different driving sessions.

In sub-step S203-4, the system extracts a facial region of interest (ROI), a right eye ROI and a left eye ROI from a first face image in the first pair of images. In particular, the extraction of the right eye ROI and the left eye ROI from the first face image comprises the following operations:

i) The system detects a plurality of facial landmarks from the first face image.

ii) The system determines a first center for the right eye based on two right eye corners in the plurality of facial landmarks and a second center for the left eye based on two left eye corners in the plurality of facial landmarks.

iii) The system determines the right eye ROI as a first squared window centered at the first center; and iv) The system determines the left eye ROI as a second squared window centered at the second center.

In sub-step S203-5, the system processes the facial ROI, the right eye ROI, the left eye ROI, a first scene image in the first pair of images, and the first embedding vector using the point of gaze regression module to generate a first predicted point of gaze (for example, the predicted point of gaze $\hat{p}_i$ as mentioned in the description of FIG. 1).

In sub-step S203-6, the system minimizes an Euclidean distance loss that measures a distance between the first predicted point of gaze and a first annotated point of gaze (for example, the annotated point of gaze $p_i$ as mentioned in the description of FIG. 1) corresponding to the first face image on the first scene image. According to an embodiment, the annotated point of gaze is collected from eye-tracking glasses that will be described later. The sub-step S203-6 is conducted in accordance with Equation 1 stated in the description of FIG. 1, so the detailed description thereof is omitted for brevity.

In sub-step S203-7, the system minimizes a triplet loss that measures a difference between a first distance and a second distance, in which the first distance measures a difference between the first embedding vector and the second embedding vector, and wherein the second distance measures a difference between the first embedding vector and the third embedding vector. The sub-step S203-7 is conducted in accordance with Equation 2 stated in the description of FIG. 1, so the detailed description thereof is omitted for brevity.

Drivers' Points-of-Gaze Dataset

The invention aims to develop a machine learning model to estimate the points-of-gaze of a driver given a pair of face and scene images. Unfortunately, there was no existing in situ dataset that can be used for training and evaluating this model, so the invention develops a dataset called Drivers' Points-of-Gaze (DPoG). The DPoG dataset contains gaze behavioral data of 11 drivers as they drove through the busy streets of an urban city. There were a total of 19 driving sessions, reflecting the real driving conditions that most drivers in this city experience every day.

Hardware and Setup

The first camera and the second camera were chosen as two GoPro cameras. The first camera was mounted on the windshield, pointing at a driver's face and recording the face and head movements. The second camera was mounted on the dashboard, pointing to the head space of the vehicle. Each GoPro had an on-board SD card, where the recorded videos were stored. To obtain the ground truth points of gaze of the drivers, a pair of SMI eye tracking glasses (Model 2) were used. Obviously, the eye tracking glasses are only needed to collect training data; they will not be needed in the final system.

The videos captured by the GoPro cameras were referred as face video and scene video, and the video captured by the eye tracking glasses was referred as gaze video. Face and scene videos were captured at 1280×720 resolution and 30 frames per second (fps), while gaze video was captured at 1280×960 resolution and 24 fps.

Driving Sessions

A total of 13 drivers (12 males, age range from 23 to 50, normal or corrected-to-normal vision) were recruited. The data was collected over two weeks at different times of the day. Each driver was asked to participate in two to three driving sessions with a short break in between sessions. For each driving session, the driver was asked to drive to a particular destination following a planned route. The duration of a driving session depends on the route and the traffic condition; the minimum, maximum, and mean were 15, 35, and 29.5 minutes respectively. After data collection, it is found that the data from several sessions was unusable, being either incomplete (e.g., no data from one of the three cameras) or corrupted (e.g., due to incorrect gaze information). The bad data sessions were subsequently excluded from the dataset. In the end, 19 usable driving sessions from 11 drivers are obtained.

Calibration

The eye tracking glasses were calibrated with a three-point calibration procedure at the beginning of each driving session. The GoPro cameras were purposefully not calibrated, given the fragile relationship between the cameras' positions and the driver's location.

Synchronization

For synchronization, drivers were asked to clap their hands before each driving session. These clapping hand moments together with audible speech and traffic noise were used to synchronize the GoPro videos. The Go-Pro videos had a consistent frame rate (30 fps), and it was sufficient to synchronize the two GoPro videos with a single time shift parameter. This time shift parameter was computed so that the shifted audio signals were maximally correlated.

It was much more difficult to synchronize between the gaze video and the other two videos. Although the gaze video was shown to be encoded at 24 fps, the actual frame rate was found that varying within each video, perhaps due to the quality of the internal clock on board the compact wearable device. Due to this inconsistency issue, it was impossible to use a global parametric model to account for the time lag and frame rate differences between the gaze video and the other two videos. To overcome this problem, short 30-60 second clips were extracted from the gaze video and each clip was synchronized individually. The corresponding face and scene clips were visually inspected and found for each extracted gaze clip. Altogether, 589 sets were collected of three synchronized video clips from the three cameras.

Point of Gaze Annotation

From the set of synchronized video clips, 176,451 triplets of synchronized (scene, face, gaze) frames were extracted. Among them, only 152,794 triplets contain gaze information because not every frame from the gaze video contained a gaze point. A technique called RANSAC-Flow [34] was used to warp the gaze frame to the scene frame and transfer the gaze point from the gaze frame to the scene frame. Depending on the difference in the perspectives of the gaze and scene frames, RANSAC-Flow might fail and there might not be a corresponding gaze point in the scene frame. All the matching results and filtered out all obviously wrong cases were manually verified. After this step, only 143,675 frame triplets remained. For quality assurance, one triplet was randomly sampled from each of 589 short clip and annotated the gaze points in the scene frames manually. On this manually annotated set, the median and mean distances between the transferred gaze point using RANSAC-Flow and the manually annotated gaze point are 9.2 and 25.1 pixels, which are relatively small compared to the size of the scene frames (1280×720 pixels).

Train and Test Split

The data was divided into disjoint training and testing sets, ensuring that the data for each driving session would be used both for training or testing and not for both. After removing bad data sessions due to missing camera view or inaccurate gaze tracking results, there were left with data from 19 driving sessions from 11 subjects (one subject with three sessions, six subjects with two sessions, and four subjects with one session). For subjects with one session, their data was put into the training set. For subjects with two sessions, one session was randomly chosen for training and one for testing. For the subject with three sessions, two sessions for training and one for testing were randomly chosen. Table 1 displays some statistics of the training data set and the train/test split.

TABLE 1

Statistics of the proposed DPoG dataset.

| Number of | Train | Test | Total |
|---|---|---|---|
| Sessions | 11 | 8 | 19 |
| Clip triplets | 354 | 235 | 589 |
| Frame triplets | 105,951 | 70,500 | 176,451 |
| Gaze frames with gaze point | 90,641 | 62,180 | 152,794 |
| Scene frames with gaze point | 85,573 | 58,102 | 143,675 |

Experiments

The experiments report the comparison of the method of the invention with several baselines and also describe ablation studies. Hereinafter, the method of the invention is referred to as the Drivers' Points-of-gaze Estimation Network (DPEN). The experiments use the Euclidean distance between the predicted gaze point and the annotated gaze point as the main performance metric. Additionally, the experiments also use the Area Under the ROC Curve (AUC), a commonly used metric for evaluating saliency prediction models [2].

1. Image-Independent Baseline Methods

One simple baseline is to always use center of the scene image as the prediction output. This baseline is motivated by the center bias phenomenon in the saliency prediction literature. Another related baseline is to always predict a fixed position, which is determined as the mean of the fixation points in the training data. This baseline also assumes there is a bias point for the fixation location, and that bias can be estimated using training data. These two baselines are referred to as Center-point prediction and Fixed-point prediction respectively.

2. Scene-Independent Baseline Methods

The experiments consider several baseline methods that make prediction based on 98 detected facial landmarks, and not the scene image. Random Forests is a method that was recently shown to outperform existing methods for person-independent appearance-based gaze estimation [3]. The experiments use the implementation provided by the authors, which was then trained on the training data to predict the target gaze point from the vector of 98 facial landmark coordinates. k-NN is a k-Nearest Neighbor estimator which has been shown to perform well in scenarios that have a large amount of dense training samples [3]. The experiments use the same k-NN implementation and also incorporate a training sample clustering in 98 facial landmarks. Finally, the experiments also proceed with Linear Regression.

3. Face-Independent Baseline Methods

The experiments consider two baseline methods that make prediction based on the scene and not the face image. Particularly, the experiments use an object detector [4] to detect cars in the scene image and localize the car instance that is closest to the center of the scene image. The predicted gaze point is then taken as the center of the detected car. The experiments refer to this method as Car-in-front prediction. This baseline method is motivated by the observation that the drivers spend a significant percentage of time looking at cars. The experiments also use TASEDNet [5], a state-of-the-art saliency detection network as another face-independent baseline method.

4. End-to-End Trainable Method

The experiments also compare the performance of the method of the invention with VideoAttentionTarget [6], a state-of-the-art network for predicting where in an image a person in the image looks at. This network was developed for a different task, and it does not have a camera calibration module. The experiments use the authors' implementation and train the network using the training data.

GazeRefineNet [7] is another state-of-the-art gaze estimation baseline. It uses the left and right eye images of a person in combination with the corresponding screen content to improve the point-of-gaze estimate. Making GazeRefineNet works on our proposed dataset is tricky. It requires the camera's extrinsic parameters as input, which are not available in our dataset. Hence, we have to assume these parameters are fixed across videos, compute their optimal value, and use them for training. We use the static version of GazeRefineNet, a similar configuration as DPEN, for a fair comparison. In their paper, GazeRefineNet used an offset augmentation to adapt gaze estimation for different people. This technique requires an explicit analysis on a video sequence of the target subject at inference time, which is impractical. Hence, we skip that augmentation and use the standard static version. GazeRefineNet's error on our dataset is 70.24, which is much larger than ours.

Table 2 shows the prediction errors of the proposed method DPEN and all aforementioned baselines. The average prediction error of DPEN is 28.44 pixels, which is relatively small compared to the size 1280×720 pixels of the scene images. DPEN outperforms other methods by a large margin. Note that VideoAttentionTarget and TASED are the two methods that output a probability map instead of a 2D location. To convert the probability distribution into a point estimate, the experiments use either the Mean or Mode of the distribution. The experiments proceed with both as shown in Table 2. The experiments can also compare DPEN with these methods in terms of AUC. The AUC of VideoAttentionTarget, TASED, and DPEN are 0.8545, 0.8793, and 0.9698 respectively. For AUC, the higher, the better.

TABLE 2

AUC and Prediction error of various methods. DPEN yields the best performance in both metrics.

| Method | Error (↓) |
|---|---|
| Center-point prediction | 159.95 |
| Fixed-point prediction | 140.78 |
| k-NN [3] | 175.71 |
| Random Forests [3] | 153.03 |
| Linear Regression | 124.00 |
| Car-in-front Prediction | 151.82 |
| VideoAttentionTarget [6]-Mean | 155.31 |
| VideoAttentionTarget [6]-Mode | 198.44 |
| TASED-Net [5]-Mean | 154.53 |
| TASED-Net [5]-Mode | 184.84 |
| GazeRefineNet [7] | 70.24 |
| DPEN (proposed) | 29.69 |
| DPEN without triplet loss | 121.19 |
| DPEN without scene image | 48.59 |

The experiments also perform an ablation study where the experiments train a DPEN model without the triplet loss. This model has the prediction error of 121.19 pixels, which is significantly worse than the model trained with the triplet loss. This clearly demonstrates the benefits of having the triplet loss and also the camera calibration module. The experiments also consider a DPEN model in which the calibration module and the triplet loss are used, but the scene image is not fed into the point-of-gaze regression module. One the one hand, this model does not work as well as the one that uses the scene image; so this demonstrates the benefits of using the scene image for prediction. On the other hand, the increase in the prediction error is not enormous. This is because the point of gaze depends on both the eye direction and the depth of the scene, and perhaps the eye direction is more important the scene depth and the experiments can obtain a reasonable estimate even without accurate depth estimation.

The experiments also perform a leave-one-subject-out experiment. Recall that the test data contains eight driving sessions from eight subjects. For each testing session, the experiments identify the driver and train a DPEN model without using the training data session from this driver, and then test on this testing session. Thus, the experiments have eight leave-one-subject-out models. Comparing the DPEN model trained with all training data sessions with the leave-one-subject-out DPEN models where the training data session from the test subject is not used for training, the leave-one-subject-out models have similar prediction errors to the full DPEN model. This proves the generalization ability of the method of the invention to new drivers.

For a system of one or more computers to be configured to perform particular operations or actions means that the system has installed on it software, firmware, hardware, or a combination of them that in operation cause the system to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a machine learning model for point of gaze prediction, the method comprising:

setting the machine learning model to include a camera calibration module and a point of gaze regression module;

obtaining a training dataset that comprises a plurality of pair of images from various driving sessions, wherein each pair of images includes a face image of a driver captured from a first camera mounted on a vehicle and a scene image of environment in front of the vehicle captured from a second camera mounted on the vehicle, wherein the scene image comprises an annotated point of gaze of the driver; and iteratively training the machine learning model using the training dataset by at least:

processing a first pair of images in the plurality of pair of images using the camera calibration module to generate a first embedding vector;

processing a second pair of images in the plurality of pair of images using the camera calibration module to generate a second embedding vector wherein the first pair of images and the second pair of images are from the same driving session;

processing a third pair of images in the plurality of pair of images using the camera calibration module to generate a third embedding vector wherein the first pair of images and the third pair of images are from different driving sessions;

extracting a facial region of interest (ROI), a right eye ROI and a left eye ROI from a first face image in the first pair of images;

processing the facial ROI, the right eye ROI, the left eye ROI, a first scene image in the first pair of images, and the first embedding vector using the point of gaze regression module to generate a first predicted point of gaze;

minimizing an Euclidean distance loss that measures a distance between the first predicted point of gaze and a first annotated point of gaze corresponding to the first face image on the first scene image; and minimizing a triplet loss that measures a difference between a first distance and a second distance, wherein the first distance measures a difference between the first embedding vector and the second embedding vector, and wherein the second distance measures a difference between the first embedding vector and the third embedding vector.

2. The method according to claim 1, wherein the camera calibration module comprises ResNet-18 model, a residual layer and an average pooling layer.

3. The method according to claim 2, wherein the point of gaze regression module comprises ResNet-18 model, a spatial weighting component comprising three 1×1 convolution layers with ReLU (Rectified Linear Unit) activation layer in between, a ReLU layer, a drop out layer with a drop-out rate of 0.5 and two fully connected layers with 4096 dimensions.

4. The method according to claim 3, wherein the first embedding vector, the second embedding vector and third embedding vector each comprises 8 parameters which represent positions and poses of the first camera and the second camera together having a coordinate system centered at the location of the driver.

5. The method according to claim 4, wherein each driving session in the various driving sessions is represented by a given destination following a planned route.

6. The method according to claim 5, wherein the annotated point of gaze is collected from eye-tracking glasses.

7. The method according to claim 6, wherein the extracting of the right eye ROI and the left eye ROI from the first face image comprises:

detecting a plurality of facial landmarks from the first face image;

determining a first center for the right eye based on two right eye corners in the plurality of facial landmarks and a second center for the left eye based on two left eye corners in the plurality of facial landmarks;

determining the right eye ROI as a first squared window centered at the first center; and determining the left eye ROI as a second squared window centered at the second center.

8. The method according to claim 7, wherein the first camera is mounted on the windshield of the vehicle and the second camera is mounted on the dashboard of the vehicle.

9. A system for training a machine learning model for point of gaze prediction, the system comprising one or more computers and one or more storage devices storing instructions that, when executed by the one or more computers, cause the one or more computers to perform operations comprising:

setting the machine learning model to include a camera calibration module and a point of gaze regression module;

obtaining a training dataset that comprises a plurality of pair of images from various driving sessions, wherein each pair of images includes a face image of a driver captured from a first camera mounted on a vehicle and a scene image of environment in front of the vehicle captured from a second camera mounted on the vehicle, wherein the scene image comprises an annotated point of gaze of the driver; and iteratively training the machine learning model using the training dataset by at least:

processing a first pair of images in the plurality of pair of images using the camera calibration module to generate a first embedding vector;

processing a second pair of images in the plurality of pair of images using the camera calibration module to generate a second embedding vector wherein the first pair of images and the second pair of images are from the same driving session;

processing a third pair of images in the plurality of pair of images using the camera calibration module to generate a third embedding vector wherein the first pair of images and the third pair of images are from different driving sessions;

extracting a facial region of interest (ROI), a right eye ROI and a left eye ROI from a first face image in the first pair of images;

processing the facial ROI, the right eye ROI, the left eye ROI, a first scene image in the first pair of images, and the first embedding vector using the point of gaze regression module to generate a first predicted point of gaze;

minimizing an Euclidean distance loss that measures a distance between the first predicted point of gaze and a first annotated point of gaze corresponding to the first face image on the first scene image; and minimizing a triplet loss that measures a difference between a first distance and a second distance, wherein the first distance measures a difference between the first embedding vector and the second embedding vector, and wherein the second distance measures a difference between the first embedding vector and the third embedding vector.

* * * * *